United States Patent
Godreau et al.

(10) Patent No.: US 12,266,912 B2
(45) Date of Patent: Apr. 1, 2025

(54) INTER-ARRAY CABLE FOR FLOATING PLATFORMS

(71) Applicant: Principle Power, Inc., Emeryville, CA (US)

(72) Inventors: Cyril Gilles Emile Godreau, Lisbon (PT); Aurélien Lorenzo Edy, Ventabren (FR); Moustafa Wagdy Ibrahim Mohamed Ibrahim, Aix-en-Provence (FR)

(73) Assignee: Principle Power, Inc., Emeryville, CA (US)

( * ) Notice: Subject to any disclaimer, the term of this patent is extended or adjusted under 35 U.S.C. 154(b) by 561 days.

(21) Appl. No.: 17/409,384

(22) Filed: Aug. 23, 2021

(65) Prior Publication Data

US 2022/0060009 A1 Feb. 24, 2022

Related U.S. Application Data

(60) Provisional application No. 63/068,486, filed on Aug. 21, 2020.

(51) Int. Cl.
*H02G 9/12* (2006.01)
*B63B 22/04* (2006.01)
*B63B 35/44* (2006.01)

(52) U.S. Cl.
CPC ............... *H02G 9/12* (2013.01); *B63B 22/04* (2013.01); *B63B 35/44* (2013.01); *B63B 2035/446* (2013.01)

(58) Field of Classification Search
CPC .......... H02G 9/12; B63B 22/04; B63B 35/44; B63B 2035/446
See application file for complete search history.

(56) References Cited

U.S. PATENT DOCUMENTS

| | | | |
|---|---|---|---|
| 6,558,215 B1 * | 5/2003 | Boatman | B63B 22/021 441/5 |
| 8,471,396 B2 | 6/2013 | Roddier et al. | |
| 10,328,996 B2 * | 6/2019 | Alm | B63B 21/502 |

(Continued)

FOREIGN PATENT DOCUMENTS

| | | | | |
|---|---|---|---|---|
| FR | 2397084 A1 | 2/1979 | | |
| JP | 2014093902 A | * 5/2014 | | B63B 21/50 |

(Continued)

OTHER PUBLICATIONS

Weerheim, Ruben, Development of dynamic power cables for commercial floating wind farms, Nov. 12, 2018.

(Continued)

*Primary Examiner* — S. Joseph Morano
*Assistant Examiner* — Jovon E Hayes
(74) *Attorney, Agent, or Firm* — Dergosits & Noah LLP; Michael E. Dergosits

(57) ABSTRACT

Inter-array cable (IAC) assemblies, systems, and methods are disclosed in which a conductive cable between two floating platforms, e.g., floating wind turbine platforms, is suspended below the sea surface and above the seabed. One or more buoyancy sections are included in the cable, which reduces the static tension on the connection at the floating platform by reducing the suspended cable weight, and which provides geometric flexibility, allowing the IAC to comply with platform motions.

15 Claims, 11 Drawing Sheets

(56) References Cited

U.S. PATENT DOCUMENTS

| | | | |
|---|---|---|---|
| 10,421,524 B2* | 9/2019 | Cermelli | B63B 22/04 |
| 10,723,415 B2* | 7/2020 | Moffat | F03B 13/20 |
| 2003/0159638 A1* | 8/2003 | Lay | B63B 21/50 |
| | | | 114/265 |
| 2009/0072544 A1* | 3/2009 | Pao | B63B 21/16 |
| | | | 290/55 |
| 2016/0114863 A1* | 4/2016 | Cermelli | B63B 22/04 |
| | | | 29/428 |
| 2018/0050764 A1* | 2/2018 | Moffat | B63B 21/50 |
| 2020/0001946 A1 | 1/2020 | Cermelli et al. | |
| 2024/0006865 A1* | 1/2024 | Eriksson | H02G 9/12 |
| 2024/0246232 A1 | 7/2024 | Persits et al. | |

FOREIGN PATENT DOCUMENTS

| | | | | |
|---|---|---|---|---|
| JP | 2019205213 A | 11/2019 | | |
| WO | 20140109705 A1 | 7/2014 | | |
| WO | WO-2014109705 A1 * | 7/2014 | | B63B 21/50 |
| WO | 20190158431 A1 | 8/2019 | | |

OTHER PUBLICATIONS

International Search Report and Written Opinion from corresponding International Patent Application No. PCT/US2021/047173, dated Dec. 6, 2021.

Extended European Search Report from corresponding European Patent Application No. 21859276.4 dated Sep. 6, 2024.

* cited by examiner

INTER-ARRAY CABLE FOR FLOATING PLATFORMS

CROSS-REFERENCE TO RELATED CASES

The present application claims priority to U.S. Provisional Patent App. No. 63/068,486, entitled "Inter-Array Cable For Floating Platforms," filed Aug. 21, 2020, which is hereby incorporated by reference.

The present application is related to: U.S. patent application Ser. No. 14/924,448, entitled "Connection System For Array Cables Of Disconnectable Offshore Energy Devices," filed Oct. 27, 2015, now U.S. Pat. No. 10,421,524; PCT App. No. PCT/US15/57636, entitled "Connection System For Array Cables Of Disconnectable Offshore Energy Devices," filed Oct. 27, 2015; and U.S. patent application Ser. No. 16/568,798, entitled "Floating Electrical Connection System For Offshore Energy Devices," filed Sep. 12, 2019, now U.S. Pat. No. 10,858,075, each of which is hereby incorporated by reference.

BACKGROUND

The present application relates to offshore energy converter units. In particular, the technology disclosed herein provides an electrical connection between individual offshore energy converter units of an offshore energy farm.

A floating offshore energy farm, e.g., an energy farm of floating wind turbine platforms (FWTPs), may include a hundred individual FWTPs, each separated from the next by thousands of meters. The power generated by a single FWTP may be 10 MW or more, and such power must be transmitted to shore, often through cables that transmit the power of multiple FWTPs. A factor in selecting an FWTP over a platform fixed to the seabed is the depth of the ocean. FWTPs are typically selected for deep water, making a cable that goes to the seabed between FWTPs extremely long, indeed. In addition, each FWTP undergoes dynamic motion due to changing ocean conditions, which adds to the necessary cable length and to the stress the cable must endure. Furthermore, the intended lifetime of a FWTP energy farm reaching multiple decades.

Thus, there exists a need for a cable for electrically connecting floating platforms that addresses the unique issues.

BRIEF DESCRIPTION OF THE DRAWINGS

The embodiments are illustrated by way of example and not limitation in the accompanying drawings, in which.

DETAILED DESCRIPTION

An offshore energy farm may include 100a or more floating platforms, such as FWTPs, each unit equipped with a source of energy production, e.g., a wind turbine producing 10 MW, providing a total power capacity of 1 GW for the entire farm. Such a farm may be installed in offshore waters with a depth exceeding 800 m.

An inter-array cable (IAC) is a cable electrically connecting two FWTPs. In deep-water, there is a real benefit in avoiding an IAC touching the seabed (a "touchdown") between FWTPs. First, removing the need to lay on the seabed between two platforms significantly reduces cable length. Second, increasing water depth increases the cable static tension at the FWTP connection due to increased weight of the increased length of suspended cable.

A configuration where the IAC is suspended between FWTPs is not driven by this phenomenon since it is uncorrelated to the bathymetry. This also means that suspended IAC arrangements do not have to account for seabed irregularities and can be more standardized over a wind farm, with the main design driver being the FWTP unit spacing.

In an embodiment, an IAC assembly and system are based on a suspended configuration in which the cable never enters in contact with the seabed. Buoyancy elements are clamped on six different sections over the cable length. The additional net buoyancy applied to specific sections of the cable has two main advantages. First, it reduces the static tension at the FWTP connections by reducing the suspended cable weight. Second, it provides geometric flexibility, allowing the IAC to comply with large FWTP motions. This configuration is a type of "floating lazy wave" in which there are multiple "lazy waves."

System Overview

In embodiments, a cable assembly facilitates an electrical connection between FWTPs using IACs fitted with accessories and incorporating some or all of the following features: a submerged floatation of the IAC between the FWTPs; position control of the IAC using a mooring system (referred to as a tether, which includes an anchor) dedicated to the IAC; compliance with platform motions during turbine operation and changing metocean conditions; decoupling of the IAC installation sequence with possible installation of the IAC both before or after FWTP installation, with installation before the FWTP potentially using surface buoys or a Floating I-tube (FIT) to facilitate locating cable ends, or allowing the cable ends to hang in the water column; controlled release and station keeping of the IAC in case of FWTP planned disconnection or FWTP Station Keeping System (SKS) failure. SKS generally include anchors attached by tethers.

Where this disclosure refers to a multiple lazy wave installation, it is referring to a design study.

System In-Service Overview

Figure 1:
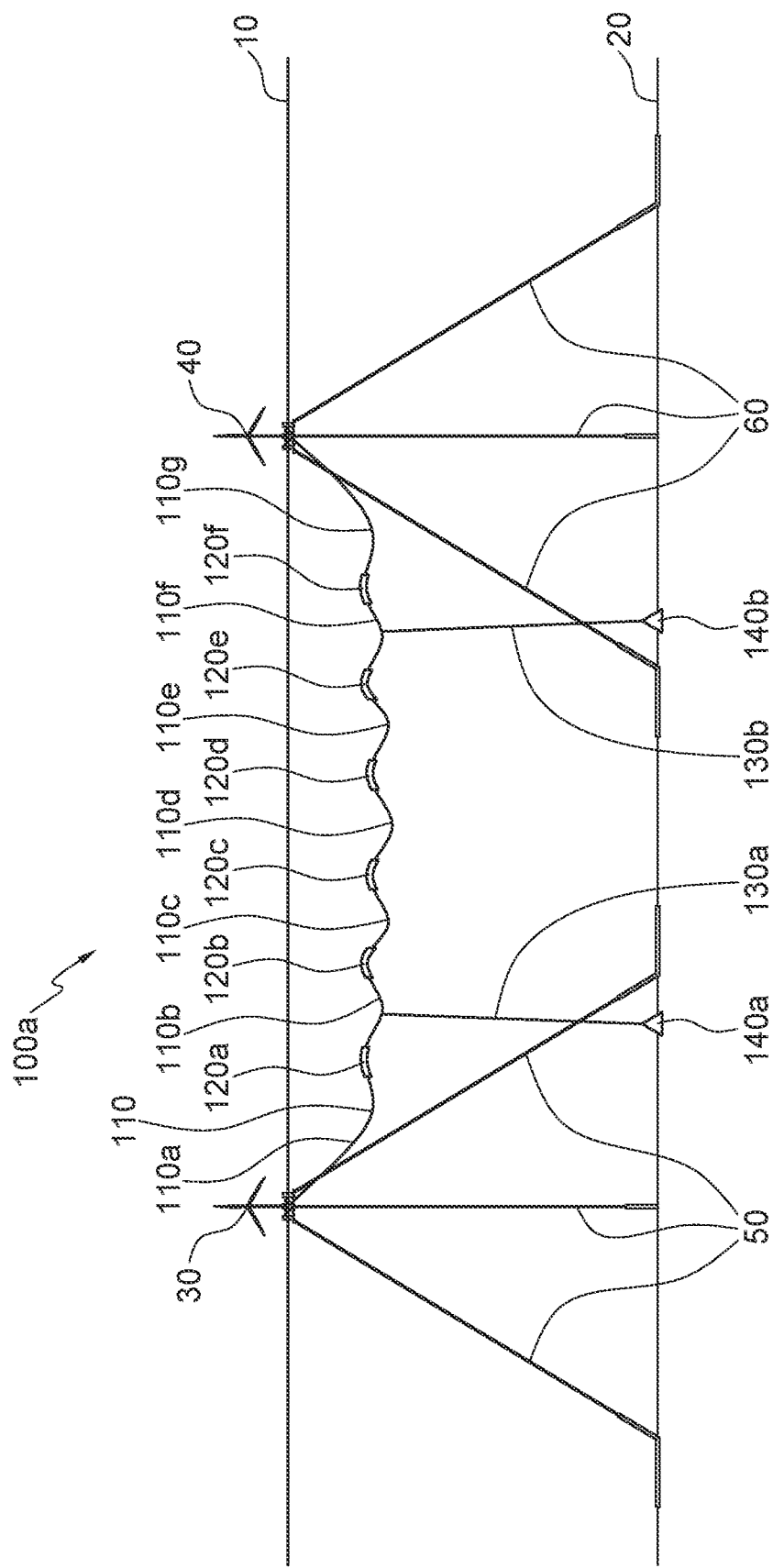
FIG. 1 is a schematic illustrating a side view of an embodiment of an Inter-Array Cable (IAC) for floating platforms.
Figure 4:
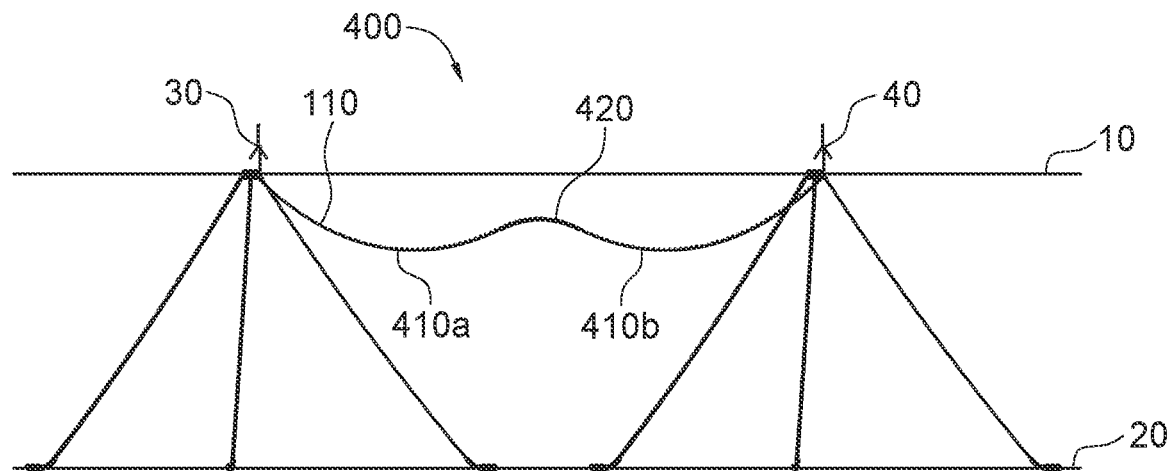
FIG. 4 is a schematic illustrating a side view of an embodiment of an Inter-Array Cable (IAC) for floating platforms.
Figure 5:
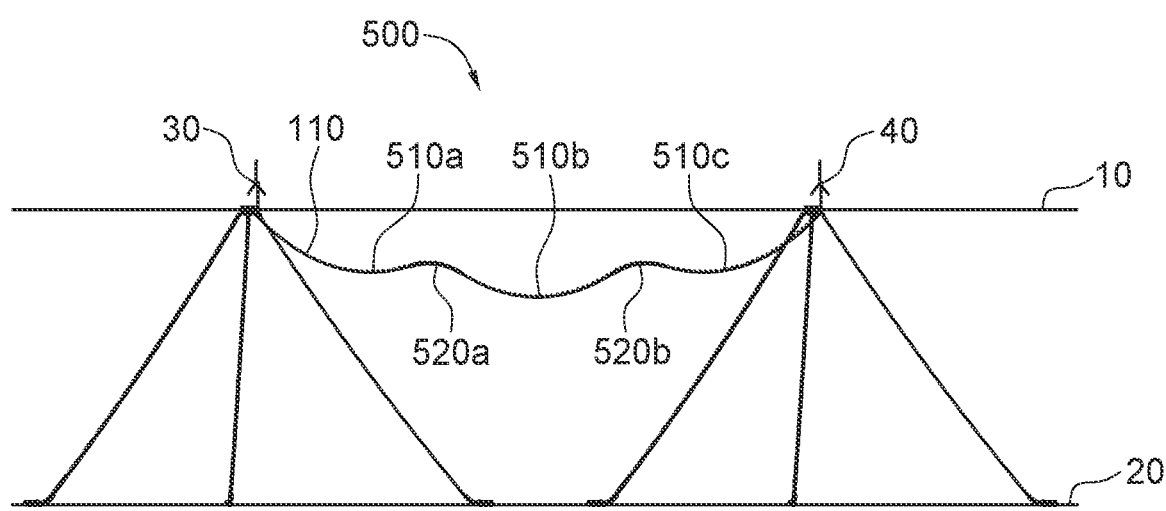
FIG. 5 is a schematic illustrating a side view of an embodiment of an Inter-Array Cable (IAC) for floating platforms.

FIG. 1 is a schematic illustrating a side view of an embodiment of an Inter-Array Cable (IAC) assembly 100a for floating platforms. In FIG. 1, IAC assembly 100a is in-service, connected between FWTP 30 and FTWP 40. FWTPs 30, 40 are maintained in position by SKS 50, 60, respectively. IAC assembly is shown to be submerged and suspended between sea level surface 10 and seabed 20. In FIG. 1, IAC assembly 100a is shown to include an insulated, conductive cable 110, buoyancy assemblies 120, and an SKS of tethers 130 including anchors 140. For convenience in the discussion, cable sections 110a . . . 110g depict discrete sections of cable 110, buoyancy assemblies 120a . . . 120f refer to a specific buoyancy assembly 120, tethers 130a, 130b refer to a specific tether 130, and anchors 140a, 140b refer to a specific anchor 140. This pattern is used to refer to elements in general, or to specific elements, throughout. Disclosure related to an element in general applies to each specific example of that element, and disclosure related to a specific element also applies to the general population of that element unless stated otherwise. While six buoyancy assemblies 120 are depicted in FIG. 1, embodiments of IAC assembly 100a may include more or fewer buoyancy assemblies 120 as shown in FIG. 4 and FIG. 5.

In the embodiment of FIG. 1, the wave shape of IAC assembly 100a is provided by buoyancy assemblies 120 fitted on cable 110a give cable 110a buoyancy over several sections (number of sections depends on site, here six sections on FIG. 1). This "lazy wave" shape provides mechanical compliance to the system allowing for relative motions of FWTPs 30, 40. In an embodiment, the depth of IAC assembly 100a may be established to be below the wave action zone and in a range where current loads can be minimized. Tethers 130 restrict IAC transverse motions due to current or wind. Tethers 130 also help control the position of IAC assembly 100a when at least one end is not connected to a FWTP (see following sections). Tethers 130 can also be used to provide a vertical restraint in the event that the buoyancy modules are configured to provide a net uplift to the cable. In an embodiment, the interface with the FWTP structure may be made using a concept known as the Floating I-Tube (FIT) disclosed in cross-referenced case: U.S. Pat. No. 10,421,524, which is incorporated by reference.

In embodiments, cable 110, may include any suitable conductor, but generally two types of cable are considered, one with Aluminum (Al) power cores and layers of steel armor wires, and the second one with Copper (Cu) cores and layers of steel armor wires. Due to its lower weight in water, the aluminum requires less buoyancy than the cable based on copper conductors. Copper cores are the most standard choice in the industry for dynamic power cables, due to their good fatigue resistance and electrical properties. The main disadvantage of copper is the high cost and the weight properties of such element.

In an embodiment, one or both cables may be dry design and XLPE insulated. The armoring required to withstand such loads may be stronger than what is typically selected for standard shallow water applications. Steel armor wires may be preferred to more advanced solutions such as carbon fiber armoring due to the maturity of such technology. Due to the increase of internal diameters with aluminum cores, the design of such a cable may be based on fewer (e.g., four layers rather than five) of armor wires only. The layers were selected in order to provide similar mechanical strength for the two cables.

In an embodiment, both cables may be wet design because the water barrier material required for dry designs typically has poor fatigue strength which makes the wet design recommended for dynamic environments.

In an embodiment, the properties of both cables may be selected in order to withstand a projected safe design tension of, e.g., 300 kN, which is common for each due to it being based on loads at the connections to the floating platform. As a result, an aluminum cable may have an area of 800 mm$^2$, a diameter of 0.172 m, a linear weight in air of 55.2 kg/m, and a linear weight in water of 31.4 kg/m, and a copper cable may have an area of 630 mm$^2$, a diameter of 0.166 m, a linear weight in air of 57.8 kg/m, and a linear weight in water of 35.6 kg/m.

It is important to note that there is no standardized cable since they are project-specific and therefore cable manufacturers usually tailor-make subsea power cables for the application at hand. Thus, cable parameters for a particular installation are determined based on the installation's design, operating, and environmental parameters.

For an offshore windfarm with a high distance between platforms (more than a nautical mile) and in a deep water environment (e.g., over 1000 m), the safe working load in tension required by the cable was set to 300 kN. This value was selected prior to the design screening based on the expected dynamic loading that the cable should be able to withstand for the worst of both touchdown and suspended configurations.

In an embodiment, with a 2580 m aluminum cable 110 (800 mm$^2$) connected between floating wind turbine platforms, buoyant assemblies 120 of buoyant modules 700 (FIG. 7) distributed across 100 m of cable 110 were located at 240 m, 640 m, 1040 m, 1440 m, 1840 m, and 2240 m along the cable, which reached a maximum depth of 541 m. In an embodiment, with 2570 m copper cable 110 (630 mm$^2$) connected between floating wind turbine platforms, buoyant assemblies 120 of buoyant modules 700 (FIG. 7) distributed across 115 m were located at 240 m, 635 m, 1030 m, 1425 m, 1820 m, and 2215 m along the cable, which reached a maximum depth of 518 m.

Regarding embodiments of cable 110, the internal components of the cable (e.g., the layers of armor) were not modelled in the simulations discussed with regard to Table 2 and Table 3. Those simulations were based on the overall properties of the cable, including, e.g., total diameter, weight, and stiffness. Thus, if one simulation assumed that these overall properties are likely to be achieved with (X) number of armor layers and a first inner wire diameter and a second simulation assumed that these same properties could possibly be achieved with (Y) number of armor layers and a second inner wire diameter, the simulations of both will show a similar result. In other words, discussion of a number of armor layers is a contemplation of how the cable cross section will appear, but does not affect the simulation.

Thus, embodiments of cable 110 may have different numbers of armor layers, e.g., from 1 to 6, without departing from the teachings of this specification.

System Pre-Installation Overview

Figure 2:
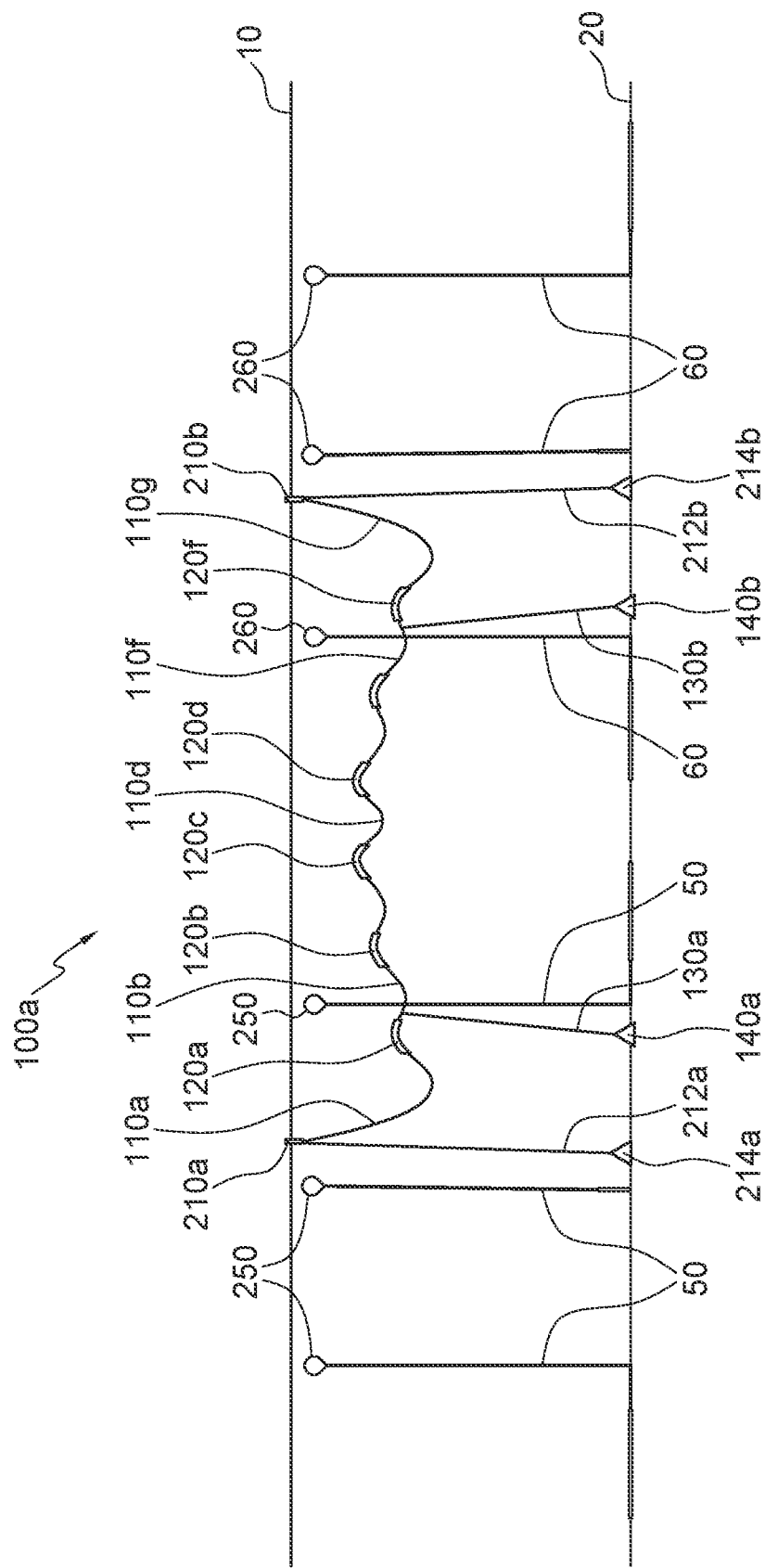
FIG. 2 is a schematic illustrating a side view of an embodiment of an Inter-Array Cable (IAC) for floating platforms.

FIG. 2 is a schematic illustrating a side view of an embodiment of an IAC assembly 100a for floating platforms. FIG. 2 depicts aspects of IAC assembly 100a before installation of FWTPs 30, 40, or after their removal. In placed of FWTPs 30, 40, SKS 50, 60 are connected to pick-up aids 250, 260, which may be simple buoyant modules, to prevent the tether end from sinking. In the embodiment, pick-up aids 250, 260 are shown suspended below surface 10, e.g., to prevent potential collisions. FIG. 2 illustrates pick-up aids 210a, 210b attached to ends of cable 110a. In embodiments, pick-up aids 210 may include a simple surface buoy, or a FIT. In embodiments, pick-up aids 210 maintain the end of cable 110 at surface 10 for easy retrieval and are themselves anchored by tethers 212 (212a, 212b) including anchors 214 (214a, 214b) to seabed 20 to maintain the position of the cable end near the location of the relevant FWTP. Pick-up aids 210 are shown to float at surface 10 because pick-up aid 210 is located relatively near the proper location of the FWTP and because it is generally better to keep the ends of cable 110 dry. FIG. 2 illustrates that IAC assembly 110 and SKS 50, 60 may be laid in advance of installing FWTPs 30, 40. After IAC assembly 100a is connected to FWTPs 30, 40, temporary anchors are removed to allow the ends of IAC assembly 100a to travel freely with the movement of the FWTP.

In FIG. 2, it is notable that FWTPs 30, 40 are absent. Pick-up aids 210 (e.g., FITs or surface buoys) await installation of the FWTP. Thus, embodiments provide for IAC assembly 100a to be installed before or after moorings or FWTPs are installed. In other words, IAC assembly 100a may be installed in a sequence decoupled from both mooring installation and platform installation. As shown in FIG. 2, IAC assembly 100a may be temporarily abandoned and allowed to float using buoyancy module assemblies 120, and Pick-up aids 210, while connected to the seabed using permanent tethers 130 and temporary tethers 212.

System Temporary Arrangement

Figure 3:
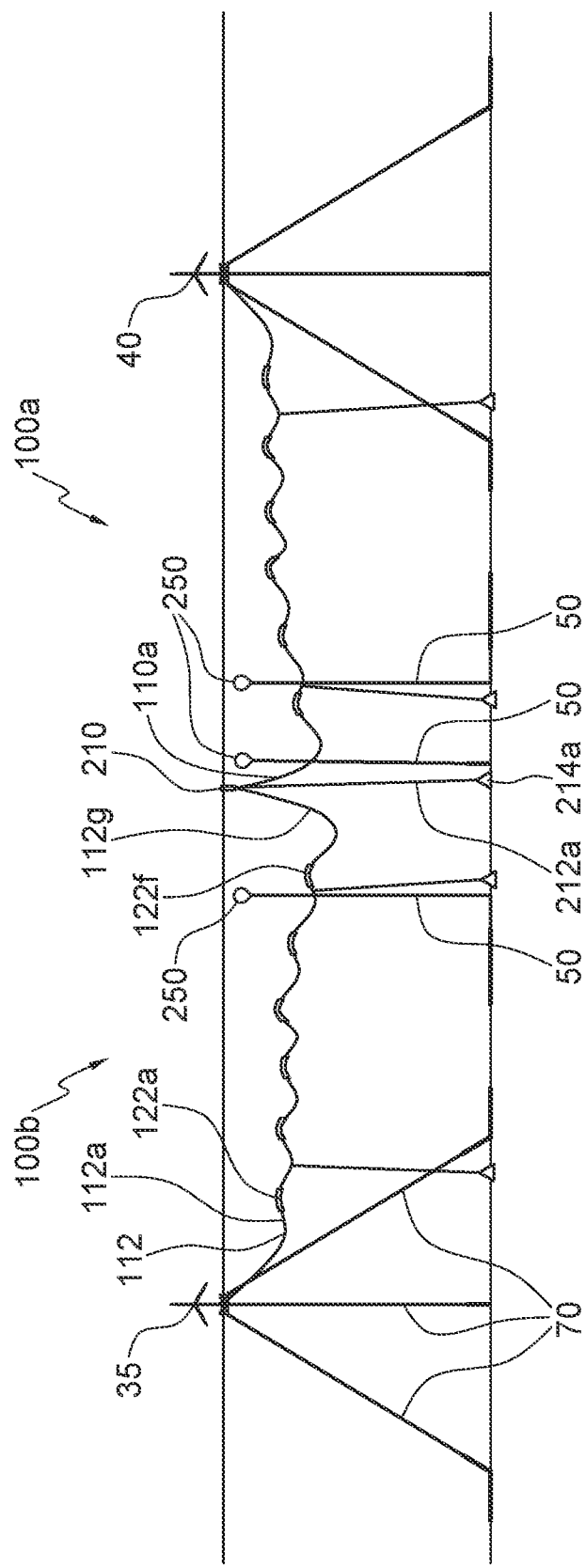
FIG. 3 is a schematic illustrating a side view of an embodiment of an Inter-Array Cable (IAC) for floating platforms.

FIG. 3 is a schematic illustrating a side view of an embodiment of an IAC assembly 100a for floating platforms. FIG. 3 depicts in-service IAC assemblies 100a, 100b in which FWTP 30 has been temporarily disconnected. IAC assembly 100b is identical to IAC assembly 100a and includes a cable 112 identical to cable 110, buoyancy assemblies 122 identical to buoyancy assemblies 120, and tethers identical to tether 130. IAC assembly 100b is connected to a FWTP 35 with an SKS 70. The arrangement of FIG. 3 allows FWTP 30 to be disconnected while maintaining electrical continuity over the remainder of the windfarm by connecting cables 110a, 110b within a FIT version of a pick-up aid 210a (FIT 210a). For example, FWTP 30 may be towed to a shipyard for repair and electrical continuity maintained by the connection of cables 110a, 110b within FIT 210a. On return of FWTP 30, FWTP may be reconnected to SKS 50, FIT 210a may be brought aboard and reconnected to FWTP 30's turbine, and the temporary tether for FIT 210a may be disconnected and stowed (or equipped with a pick-up aid).

Fail Safe Feature of the System

FIG. 3 illustrates a fail-safe feature of the system provided by tethers 130 associated with cables 110 and the tether associated with FIT 210a. As shown in FIG. 3, IAC assembly 100a from FWTP 1 and IAC assembly 100a from FWTP 3 have been electrically connected inside a FIT. With the tethers remaining in place, the FIT remains positioned for the return of FWTP 2.

FIG. 4 is a schematic illustrating a side view of an embodiment of an IAC assembly 400 for floating platforms. The description of IAC assembly 100a and buoyancy assembly 120 applies to IAC assembly 400 and buoyancy assembly 420, except for the number of buoyancy assemblies. FIG. 4 illustrates that IAC assembly 400 includes but one buoyancy assembly 420 dividing cable 110 into larger sections 410a, 410b. Buoyancy assembly 420 is relatively larger than each buoyancy assembly 120 due to assembly 420 being optimized to support cable 110 above the seabed and below the sea surface. As seen in Table 2 and Table 3, within, buoyancy assembly 420 provides less total buoyancy than the aggregate of buoyancy assemblies 120.

FIG. 5 is a schematic illustrating a side view of an embodiment of an IAC assembly 500 for floating platforms. The description of IAC assembly 100a and buoyancy assembly 120 applies to IAC assembly 500 and buoyancy assembly 520, except for the number of buoyancy assemblies. FIG. 5 illustrates that IAC assembly 500 may include two buoyancy assemblies 520a, 520b dividing cable 110 into larger sections 510a, 510b, 510c. Each buoyancy assembly 520 is relatively larger than each buoyancy assembly 120 due to assemblies 520 being optimized to support cable 110 above the seabed and below the sea surface. As seen in Table 2 and Table 3, within, buoyancy assembly 520 provides less total buoyancy than the aggregate of buoyancy assemblies 120.

Figure 6:
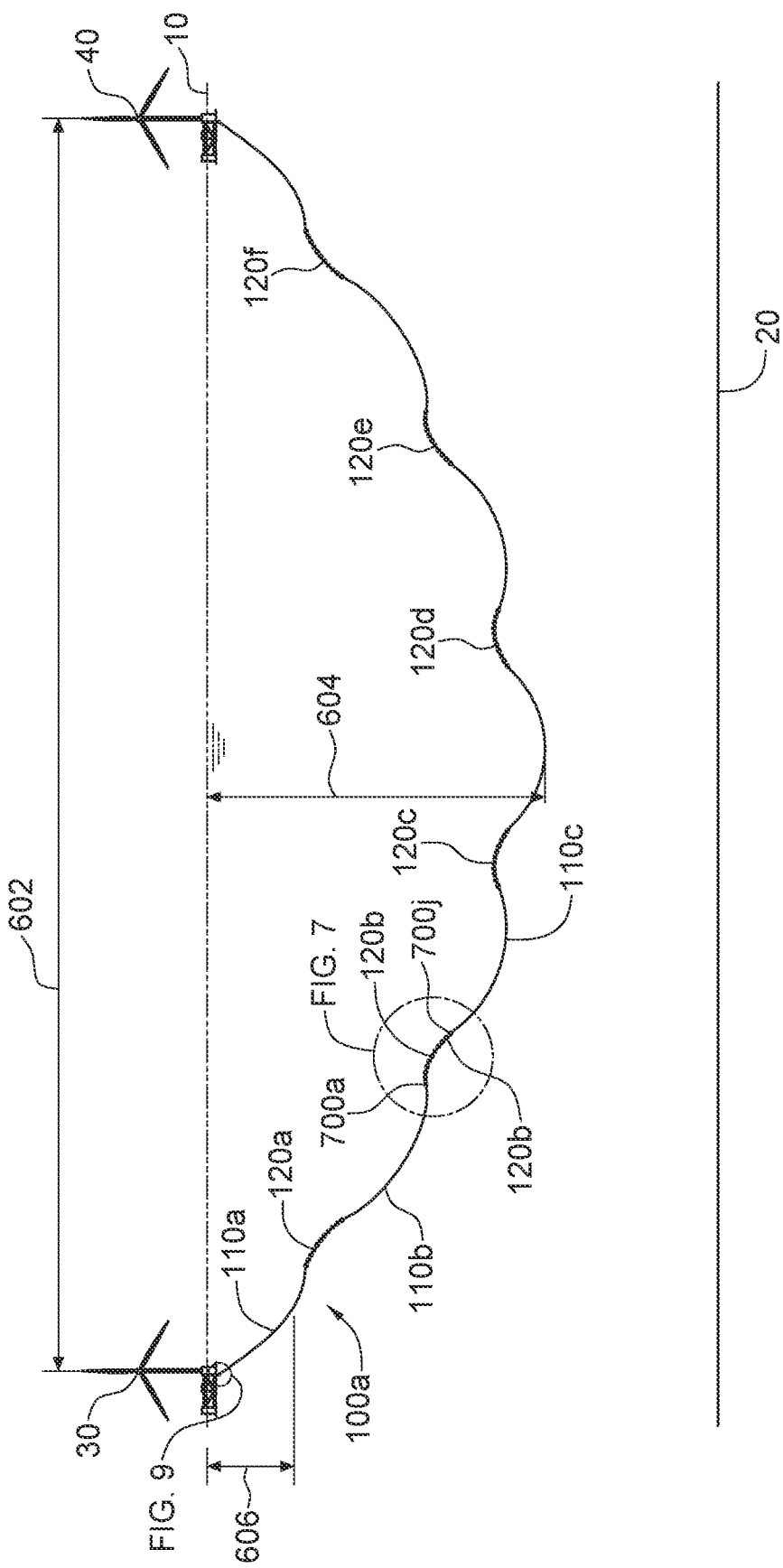
FIG. 6 is a schematic illustrating a side view of an embodiment of an Inter-Array Cable (IAC) for floating platforms.

FIG. 6 is a schematic illustrating a side view of an embodiment of an IAC assembly 100a for floating platforms. In FIG. 6, an exemplary spacing 602 is 2,000 m, an exemplary maximum depth 604 is 500 m, and an exemplary wave-action depth 606 is 75 m. Comparison of FIG. 6 to FIG. 1-FIG. 3 illustrates that individual buoyancy assemblies 120 may float at different depths with IAC assembly 100a is installed. The different depths may be due to a number of factors, including, for example: the distances of cable 100a supported by a given buoyancy assembly 120; different buoyancies of different buoyancy assemblies 120; the tensions at the connections of cable sections 110a, 110b to FWTPs 30, 40; and the effect of bio colonization (marine growth) on the cable sections. Thus, FIG. 1 shows buoyancy modules 120a . . . 120f of IAC assembly 100a submerged at a relatively uniform depth causing IAC assembly 100a to assume a relatively linear shape, while FIG. 2 shows buoyancy modules 120a . . . 120f at different depths, causing IAC assembly 100a to assume an arcuate shape, and FIG. 6 shows buoyancy assemblies 120a . . . 120f at different depths, causing IAC assembly 100a to assume an inverted arcuate shape.

However, the buoyancy assemblies 120 in FIG. 1, FIG. 2, and FIG. 6 all illustrate a common feature—they have arcuate shapes that are convex toward the surface-side of IAC assembly 100. As a result each buoyant assembly 120 and the unsupported sections of cable 110 on either side imparts a slight wave—a "lazy wave"—to IAC 100. Each lazy wave provides IAC assembly 100 with an element of slack, which in turns allows IAC assembly 100 to adapt to expected movements of FWTPs 30, 40 without experiencing excess tension.

FIG. 6 further illustrates that buoyancy sections 120a . . . 120f are distributed along cable 110 and provided with buoyancy such that each section is below wave-action zone 606. Wave action zone 606 differs according to the specific environmental and geographic features at specific locations. Configuring buoyancy assemblies 120 with buoyancy than causes them to float submerged below wave action zone 606 may reduce fatigue on cable 110 by reducing movement of buoyancy assemblies 120 due to currents caused by wave action.

Figure 7:
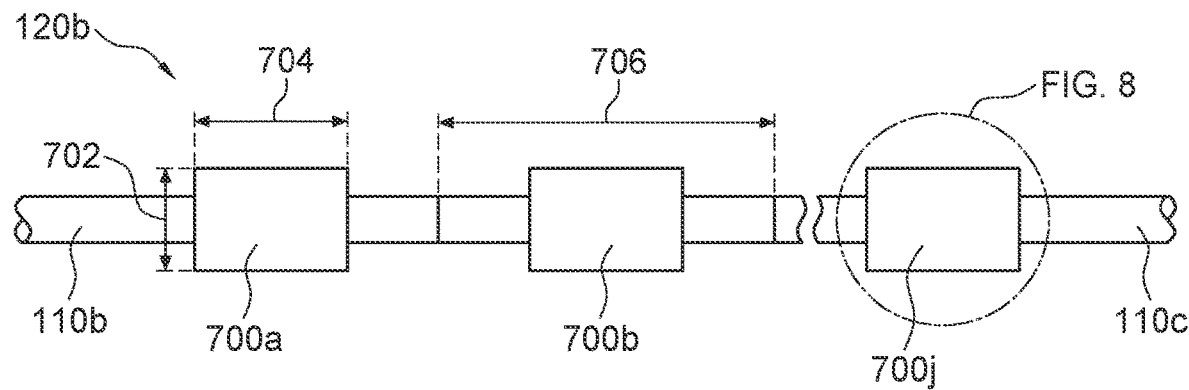
FIG. 7 is a schematic illustrating aspects of the indicated section of FIG. 6 in further detail.

FIG. 7 is a schematic illustrating aspects of the indicated section of FIG. 6 in further detail. FIG. 7 illustrates that a buoyancy assembly 120 may include individual buoyancy modules 700 connected to cable 110. FIG. 7 illustrates three buoyancy modules 700a . . . 700c connected to cable 110, but in embodiments the number may vary according to the buoyancy provided by a particular buoyancy module and the total buoyancy needed. For example, FIG. 7 illustrates that each buoyancy assembly 120 may have 11 buoyancy modules. FIG. 6 illustrates that buoyancy modules 700 have a diameter 702, a length 704, and a pitch 706. In an embodiment, a pitch of greater than 5 m in which the same buoyancy was distributed over a larger section produced better results.

Figure 8:
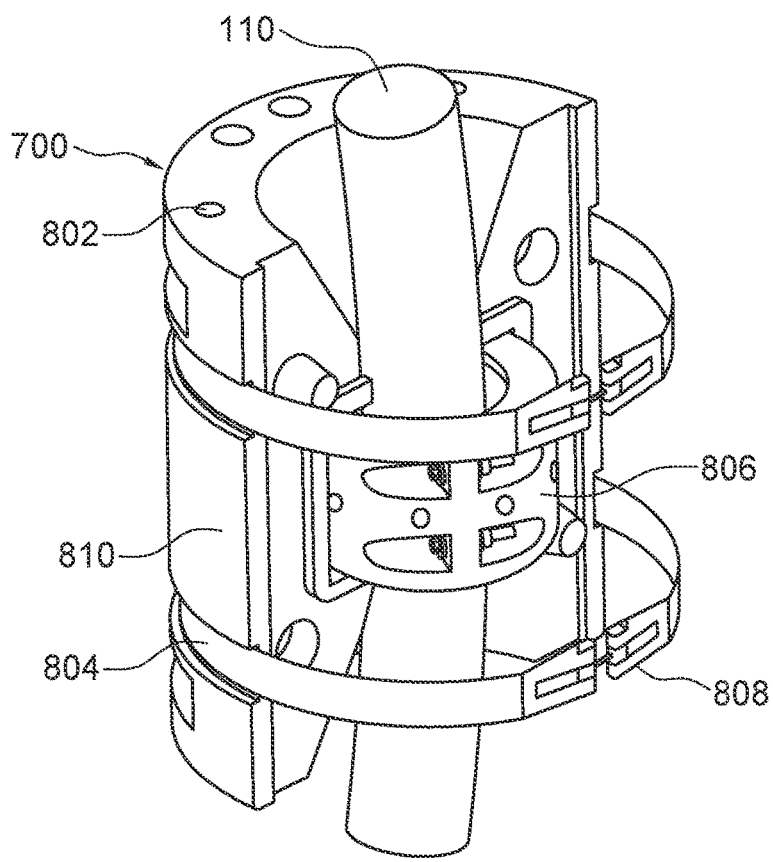
FIG. 8 is a partially-transparent drawing illustrating aspects of an embodiment of an Inter-Array Cable (IAC) for floating platforms.

FIG. 8 is a drawing illustrating part of an embodiment of a buoyancy module 700. In FIG. 8, buoyancy module 700 is shown without a second half of a body 810. Buoyancy module 700 includes lifting holes 802, a securing strap 804, an internal clamp 806, and two tensioning assemblies 808. The missing second half of body 810 would mirror the illustrated half within tensioning assemblies 808, covering cable 110 and clamp 806.

In an embodiment, an exemplary buoyancy module 700 may have: an external diameter 702 of 1.3 m, a length 704 of 1.2 m, a density of 350 kg/m^3, a pitch 706 of 10 m, and a displacement of approximately 1600 kg (slightly higher for copper cable than aluminum).

In an embodiment, buoyancy modules 700 may be cylindrical polyethylene structures filled with a buoyant material and distributed along sections of cable 110 (typically a lazy wave configuration). Depending on the water depth, different chemical materials and/or proportions may be used to fill the module. Each buoyancy module 700 imparts up thrust to the cable to reduce tension, especially at hang-off. From the requirement of the selected IAC configuration, the amount of required net buoyancy over specific cable sections is established. Based on these requirements, an optimization can be performed to select the most cost effective and technically performant design for the modules. In embodiments, other types of buoyancy modules may be used, e.g., buoys could be attached to cable 110 in an arrangement similar to the distributed arrangement of buoyancy modules 700 in a buoyancy assembly 120.

Furthermore, in embodiments, sections of cable 110 may be made buoyant by adding buoyancy to the section in other ways, e.g., by adding a buoyant coating to the cable.

Figure 9:
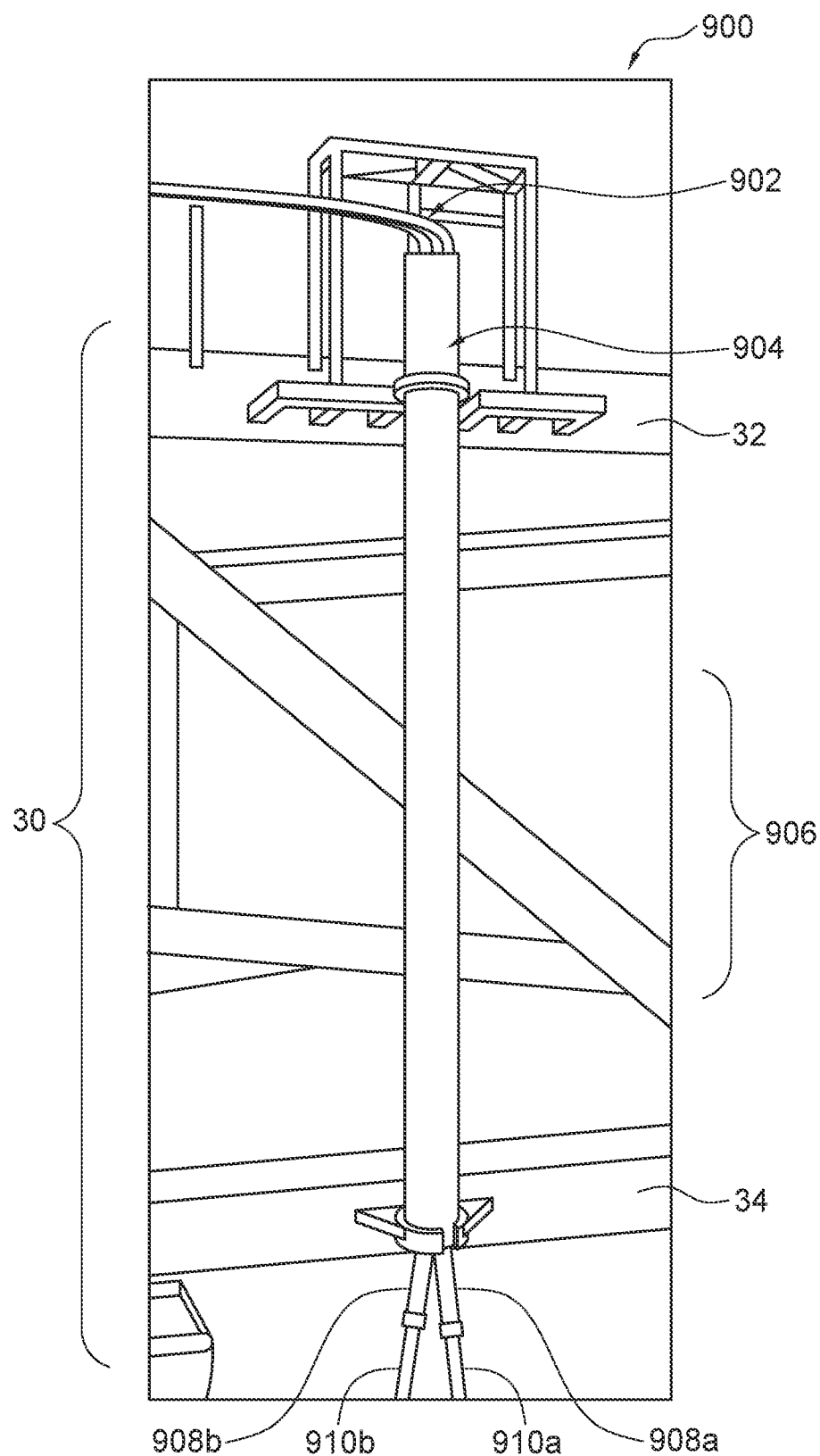
FIG. 9 is a drawing illustrating the indicated section of FIG. 6 in further detail.

FIG. 9 is a drawing illustrating the indicated section of FIG. 6 in further detail. FIG. 9 illustrates that a FIT 900 (which is the same as the FIT described with reference to pick-up aid 210) may be used to connect cable 110 to FWTP 30 and to connect cable 112 to FWTP 30, e.g., after FWTP 30 is brought back into position between FWTPs 34, 40 (see FIG. 3). In FIG. 9, FTWP 30 is shown to include cross-members 32, 34. FIT 900 is attached to cross-members 32, 34 with brackets. Cable section 110a enters FIT 900 through a bend stiffener 910a that is connected to a bend stiffener receptacle 908a. Cable 110a runs within a splash zone (or FIT body) 906 of FIT 900 to a hang-off and connectors housing, within which cable 110a is connected to cabling 902 from an energy generation device, e.g., a wind turbine generator. Cable section 112g is routed similarly and connected to cabling 902.

As shown in FIG. 9, FIT 900 is rigidly attached to FWTP 30 during normal operation. To disconnect the FIT 900 from the FWTP 30, FIT 900 would be lowered to its floating draft, disconnected from the brackets, and then pulled away from FWTP 30 with a small support vessel. This would only be necessary while FWTP 30 station keeping system is being disconnected. FIT 900 is designed to support two or more electric cables while FWTP 30 is onshore for operations and maintenance activities. Prior to deployment, an enclosed bay of FIT 900 may be pressurized to guarantee the required buoyancy. After the major operations and maintenance operation, FWTP 30 may be brought to location and hooked-up to SKS 70. The disconnection process is then reversed, with FIT 900 being pushed back to the platform with a small vessel. Fenders located at the bottom of FWTP 30 would guide FIT 900 into place and restrain its motion. A winch onboard FWTP 30 may be used to pull up FIT 900. The tension on the winch would vary depending on the water depth and IAC assembly.

Figure 10:
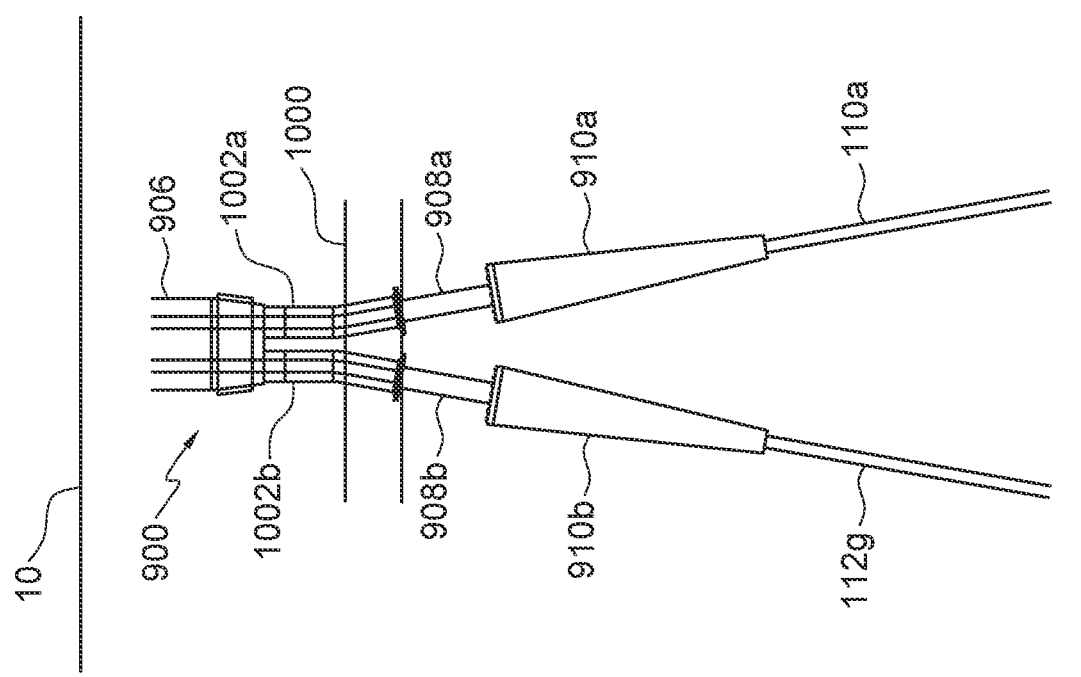
FIG. 10 is a drawing illustrating aspects of an embodiment of an Inter-Array Cable (IAC) for floating platforms.

FIG. 10 is a drawing illustrating aspects of FIT 900, such as cable section 110 entering bend stiffener 910, running through a latching mechanism 908 connected to an inner tube 1002 that itself runs within splash zone 906. A section 1000 indicates the relative location of the bottoms of columns of FWTP 30, e.g., where water entrapment plates may be located.

Figure 11:
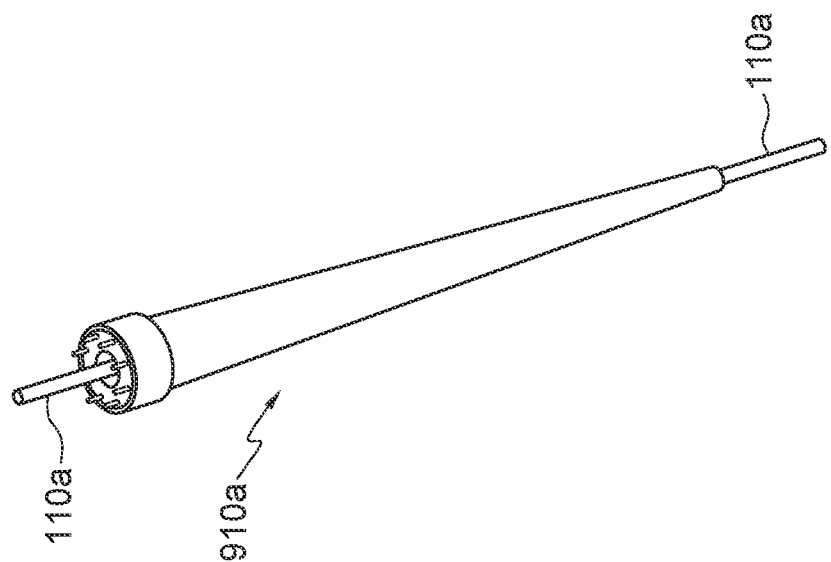
FIG. 11 is a drawing illustrating aspects of an embodiment of an Inter-Array Cable (IAC) for floating platforms.

FIG. 11 illustrates cable section 110 running through bend stiffener 910. In an embodiment, bend stiffener 910 is a conical/tapered elements, typically made from polyurethane, and used to add local transition stiffness to cable 110 to keep the curvature and bending stress within the allowable limits, which prevents fatigue and overbending failures. Bend stiffeners 910 are suited for dynamic loads. A bend stiffener is typically required at the cable entry into a FIT.

Figure 12:
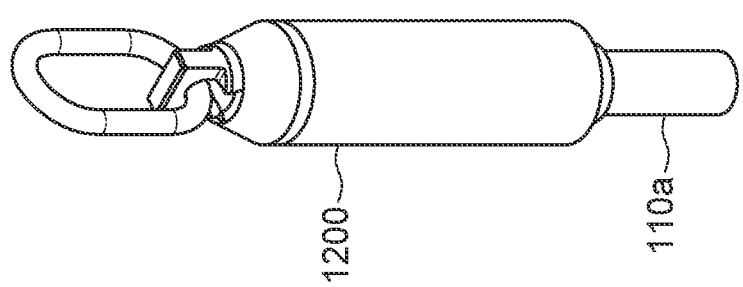
FIG. 12 is a drawing illustrating aspects of an embodiment of an Inter-Array Cable (IAC) for floating platforms.

FIG. 12 is a drawing illustrating aspects of an embodiment of an IAC assembly 100. In FIG. 12 a pull-in head 1200 is shown attached to the end of cable 110. Pull-in head 1200 is a temporary addition to IAC assembly 100 that is used to lift the topside end of the cable to the required position on the platform. Pull-in head 1200 is designed to withstand installation loads and underwater environment and allow cable 110 to be pulled through bend stiffener 910, stiffener receptacle 908, and tube 1002 without causing any damage to the cable or any of its components. Two pull-in heads are required per IAC assembly 100 in order to perform first end and second end pull-in operations. Pull-in head 1200 is removed to allow for cable section 110a to be electrically connected to cabling 902.

In an embodiment, pick up aid 210 may include a buoy or one or more buoyant modules 700, instead of a FIT 900. Such an arrangement may be used, e.g., when IAC assembly 100 is deployed before FWTP 30. Thus, pick up aid 210 would maintain pull-in head 1200 at the surface and accessible for use in pulling cable 110 through FIT 900.

Figure 13:
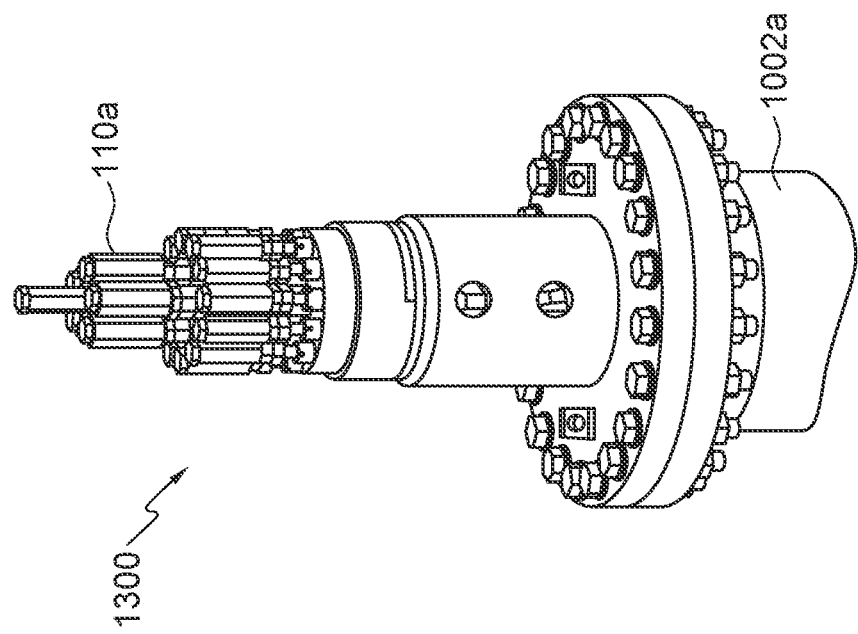
FIG. 13 is a drawing illustrating aspects of an embodiment of an Inter-Array Cable (IAC) for floating platforms.

FIG. 13 is a drawing illustrating aspects of FIT 900. FIG. 13 illustrates a hang-off device 1300 through which cable section 110 emerges to be connected to cabling 902. Hang-off device 1300 is situated atop internal tubing 1002 within hang-off and connectors housing 904. Hang-off device 1300 an assembly that is connected through a flange to the top of tube 1002 to support cable 110 at the suspension point on FWTP 30 before cable 110 reaches electrical connections 1506 (FIG. 15) for cabling 902.

Figure 14:
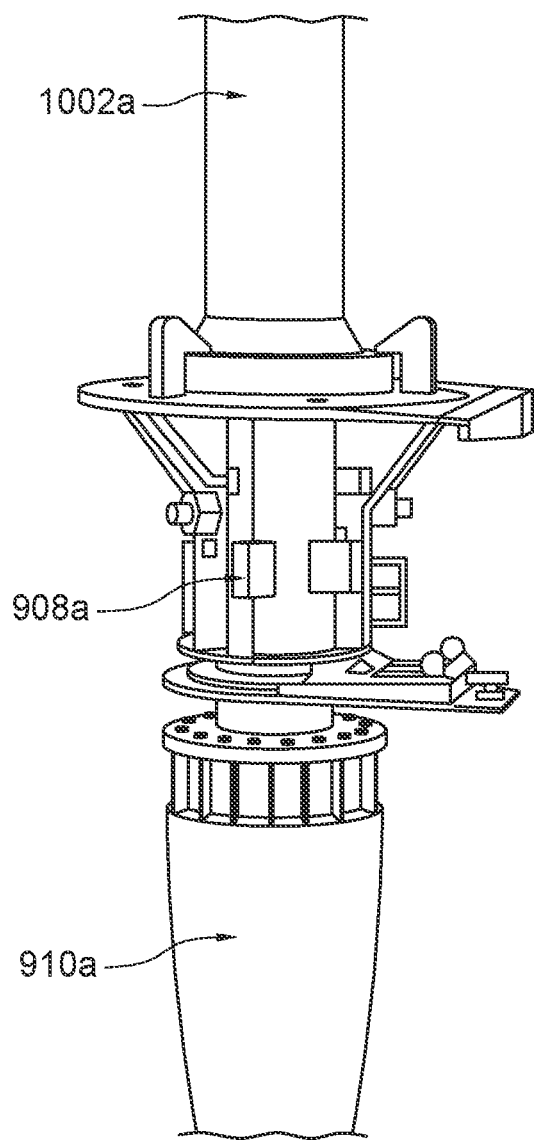
FIG. 14 is a drawing illustrating aspects of an embodiment of an Inter-Array Cable (IAC) for floating platforms.

FIG. 14 is a drawing illustrating aspects of an embodiment of a FIT. In FIG. 14, latching mechanism 908 is shown to connect bend stiffener 910 to inner tube 1002. Latching mechanism 908 is a mechanism that locks bend stiffener 910 to tube 1002 using a rigid connection that transfers the bending shear and bending moment loads from cable 110 to FIT 900. In an embodiment, bend stiffener may be connected directly to inner tube 1002.

Figure 15:
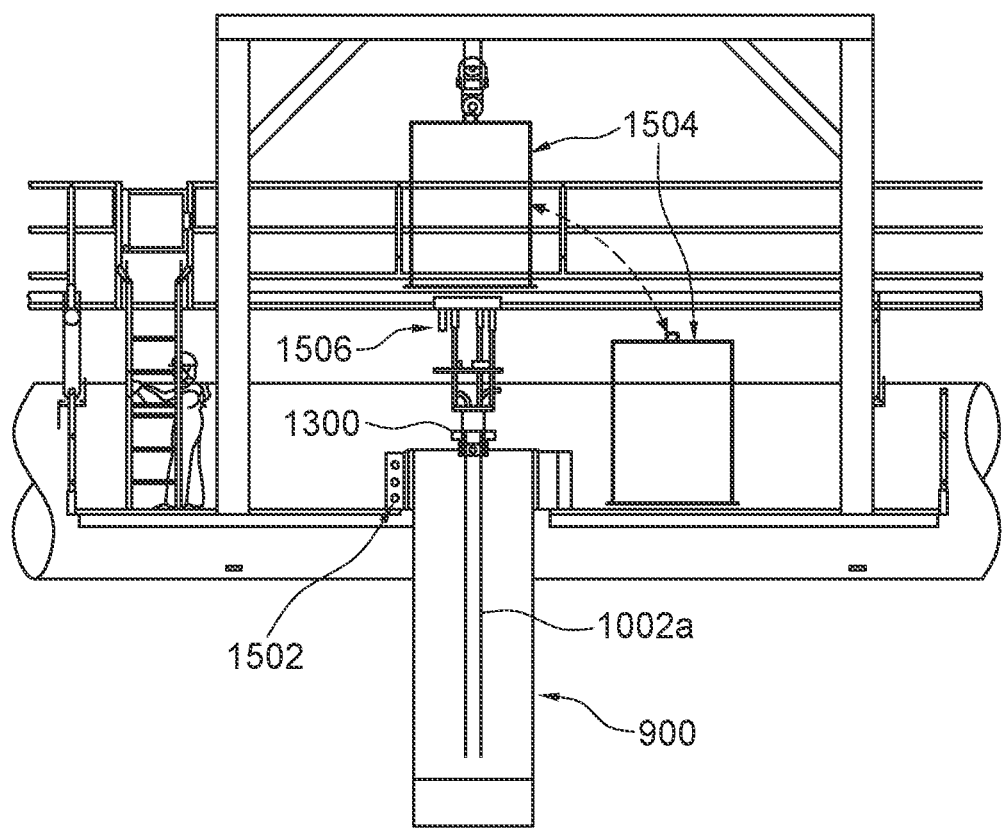
FIG. 15 is a drawing illustrating aspects of an embodiment of an Inter-Array Cable (IAC) for floating platforms.

FIG. 15 is a drawing illustrating aspects of an embodiment of a FIT. In FIG. 15, FIT 900 is shown connected to FWTP 30 using a clamping system 1502. Hang off device 1300 is uncovered by the removal of hang-off and connectors housing 904. Cable section 110a is connected to electrical connection 1506, to which cabling 902 may be connected. A joint box cover 1504 may be lowered over connections 1506 to seal FIT 900 and provide buoyancy. Cable 112 (not shown for clarity) would be provided with its own hang off device 1300 and connections 1506. Both cable 110 and cable 112 are covered by joint box cover 1504.

FIT 900 provides for a quick connection and reconnection of cable 110, 112 in case of, e.g., a large maintenance operation. Connection 1506 may be High Voltage T-Connectors (e.g., as described in Nexans or NKT Catalogues). In embodiments, two or even more cables 110 may be routed within FIT 900 and connected to cabling 902, as shown with cable 110. If FWTP 30 needs to be removed from the wind farm, cabling 902 may be disconnected from connections 1506 and joint box cover 1504 sealed to FIT 900, making FIT 900 ready for deployment at sea.

Fail Safe Feature of the System

In case of an FWTP SKS failure, e.g., SKS 60, IAC assembly 100 may be is released from an FWTP that experiences large position changes. The buoyancy of FIT 900 and buoyancy assemblies 120 then keep IAC assembly 100a away from the seabed and tethers 130 and 212 ensure that FIT 900 remains within a small range of offsets from the original FWTP location, without drifting towards other assets. Due to the multiple tethers 130, 140, the failure of one tether does not lead to an IAC assembly drifting across a windfarm.

In an embodiment, a weak link can be fitted in the connection assembly, e.g., at hang off device 1300 to allow emergency release of the cable. In case of an accident that would trigger high cable tensions beyond to the safe allowable tension limit (such as fishermen's net or broken mooring line scenario), the weak link may release and free cable 110 before damage occurs to FIT 900 or SKS 60.

In embodiments, tethers 130, 140 connected to an IAC assembly 100 control the position of IAC assembly 100, particularly if the FWTP is removed. The use of a tether assists in keeping IAC assembly 100 separated from FWTP mooring lines. In an upper section, tethers 130, 140 may include a connector to attach the tether to an IAC assembly 100. The majority of the tether may be a synthetic rope. And the lower section of the tether includes an anchor, such as a weight of, e.g., greater than 10 tons. Additionally, the use of bend stiffeners or bend restrictors at the tether points and at the transition from the buoyant section to the free ends exists as an option.

Advantages of Embodiments

The advantages of the concepts discussed within include: a reduced total length of IAC over the farm compared to arrangements where any IAC is laid on seabed between connected FWTPs; a reduction in loading on IAC connections at the FWTP compared to arrangements where the hang-off bears the weight of the entire suspended length of IAC cable in the water column; a reduction in the hydrostatic pressure rating of IAC assembly 100 compared to arrangements where IAC is laid on the seabed between connected assets (this advantage increases with increasing water depth at the FWTP location); a flexible installation sequence compared to techniques that impose a cable be laid after FWTP connection to the SKS (IAC assembly 100a installation is decoupled and can be done before or after the SKS and/or FWTP); a reduction of the hydrostatic rating of temporary end-terminations (e.g., pull-in heads 1200) compared to installation methods which require the temporary abandonment of the cable end on the seafloor prior to connection to the FWTP; a reduction in buoyancy requirements in the FIT compared to arrangements where the FIT is required to support the full weight of the suspended IAC to the seafloor; a simplification in the necessary equipment and installation sequence compared to current techniques that attempt to suppress touchdown point forces on risers or umbilicals by using mid-water arches or deep-water rated buoyancy modules or coatings; drier IAC terminations (installation sequence does not involve deep abandonment of IAC, terminations can even be kept dry inside the FIT; continuity (in case of removal from the farm of one FWTP unit, the electrical continuity may be maintained); and redundancy (in case of an SKS failure, IAC connection failure, or IAC tether failure, the tethered floating IAC remains in position and does not drift over the field).

As described above, embodiments of an IAC may be used in various methods. In a method, the length of cable required to connect two FWTPs may be reduced by using an IAC assembly to float the cable between the two FWTPs rather than have the cable extend from one FWTP, down the ocean floor, along the ocean floor, and up to the second FWTP. In an embodiment of a method, an IAC assembly is designed so that the main buoyant and tethered section, e.g., the section of cable 110 bounded by the initial and final buoyancy assemblies 120, is positioned in the water column below the wave action zone and, potentially at a water depth where current loads and perhaps weight caused by marine growth are reduced.

In a method, the weight associated with the attachment of a cable to an FWTP is reduced by using an IAC assembly to float the cable between the two FWTPs rather than have the cable extend from the FWTP down the ocean floor. In the method, the weight reduction is used to reduce the load-bearing requirements of a connector from the IAC assembly to the FWTP in comparison to the load-bearing requirements of a connector required if the cable was suspended from the FWTP to the ocean floor.

In a method, the required buoyancy of a pick-up aid (e.g., a buoy or FIT) is reduced by using an IAC assembly to float the cable between the two FWTPs rather than have the cable extend from the FWTP down the ocean floor.

In a method, the degree of environmental protection (sealing) required in a cable between two FWTPs is reduced by using an IAC assembly to float the cable between the two FWTPs rather than have the cable extend from the FWTP down the ocean floor.

In a method, in a first step, an IAC assembly may be installed between a first position and a second position, where the first and second positions are designated for FWTPs. In a second step, first and second FWTPs may be installed at the first and second positions. In this method, the order of the first and second steps may be reversed.

In a method, in one step, an IAC assembly may be installed between a first position and a second position, where the first and second positions are designated for FWTPs. In a second step an SKS may be installed at each of the first and second positions. In a third step, first and second FWTPs may be installed at the first and second positions. In this method, the first step may be performed before or after any other step.

Preliminary Considerations

In developing the features of the disclosure a number of cable configurations were considered using computer simulations. These included the following.

Touchdown configurations, in which the middle section of the cable (in-between two floating platforms) lays on the seabed. From one platform to the next, the cable goes from its platform's connection point down to the seabed, then it is laid for some distance on the seafloor, and finally it comes up again to the next platform's connection point. A first touchdown configuration is catenary. With a catenary configuration the cable is freely laid in the water and on the seabed between the platforms without any subsea equipment apart from the top bending stiffeners. It may be the most economical one in shallow water in terms of both hardware and installation cost, but may not be for deep water. Catenary configurations are disfavored for deep water applications because of the high loads that are induced by the length of cable hanging from the platform connection to the seabed, and because platform motions remain coupled to the cable in the touchdown zone on the seabed. A second is catenary buoyant. With a catenary buoyant configuration a cable laid as with a catenary configuration, but buoyancy modules are distributed evenly along the cable to reduce the equivalent weight in water of the line, which results in the cable lifting partially from the seabed, but does not induce a lazy wave. A third is a touchdown lazy wave, in which a section of the cable in the water column is fit with a buoyancy assembly to a single "lazy wave" to the configuration. A benefit of this solution is it provides compliance with platform motions in every direction. Drawbacks include the potential compression of the cable in the touchdown area and the potential for the cable to fold back on the seabed if the platform motions are too large relative to water depth. This solution may be preferred for riser and umbilical applications in shallow water due to its robustness, simplicity and relatively low overall cost.

Non-touchdown configurations include the following. A U-shape is the simplest of the suspended configuration, and consequently the most economical in terms of cable accessories. With a U-shape the cable is suspended from hang-off to hang-off, without any additional subsea equipment apart from the top bending stiffeners. A U-shape buoyant, which is similar to the U-shape, but with buoyancy modules spread evenly across the full cable length to reduce the equivalent weight in water of the line, and thus reduce cable tension levels, but without inducing a lazy wave. A single floating lazy wave in which a buoyancy assembly is located at the mid-cable location in order to provide geometric robustness of a wave configuration for the suspended solution and to reduce cable tension. A multiple floating lazy wave in which multiple buoyancy assemblies are attached to the cable with unsupported sections of cable in between. With a multiple floating lazy wave, the number of buoyancy assemblies and the properties need to be optimized to enhance the overall cable loads and motions. With sufficient buoyancy assembly numbers, the multiple floating lazy wave provides advantages from the U-shape and touchdown lazy wave solutions. Table 1 summarizes the configurations and preliminary considerations.

TABLE 1

| | | | | | | | |
|---|---|---|---|---|---|---|---|
| Preliminary Considerations | | | | | | | |
| Configuration | U-Shape | U-Shape Buoyant | Single Floating Lazy Wave | Multiple Floating Lazy Wave | Touchdown Lazy Wave | Catenary | Catenary Buoyant |
| Touchdown Contact | No | No | No | No | Yes | Yes | Yes |
| Buoyancy | No | Yes | Yes | Yes | Yes | No | Yes |
| Cable Length | Short | Short | Short | Short | Long | Long | Long |
| Compression | No | No | No | No | Possibly | Possibly | Possibly |
| Tension | Medium | Low | Medium | Low | Medium | High | Low |
| Platform Dynamics Compliance | Low | Low | Medium | High | High | Low | Low |

Static Screening

The first step in screening was focused on static considerations using further computer simulations. The seven configuration were compared under the same conditions, which will not be discussed.

Table 2 presents the results from the static screening for each of the seven configurations. Two configurations, the U-shape and the catenary, were rejected at this stage because it was not possible to achieve solutions with maximum cable tensions below 300 kN, which was the criteria chosen for a safe allowable working load.

In addition, the single floating lazy wave solution was rejected because the maximum tension was close to the design limit in static, and it is expected to increase when transitioning to dynamic simulations.

As a result, the solutions chosen to continue to the next, dynamic step in the screening process were the following: U-Shape buoyant (lowest tension results, lowest cable length and medium buoyancy requirement); Multiple floating lazy wave (low tension results, low cable length and medium buoyancy requirement); Catenary buoyant (low tension results, high cable length and highest buoyancy requirement); Touchdown lazy wave (medium tension results, highest cable length and lowest buoyancy requirement).

TABLE 2

| Static Screening | | | | | | | |
| --- | --- | --- | --- | --- | --- | --- | --- |
| Configuration | U-Shape | U-Shape Buoyant | Single Floating Lazy Wave | Multiple Floating Lazy Wave | Touchdown Lazy Wave | Catenary | Catenary Buoyant |
| Total Cable Length (m) | 2300 | 2400 | 2366 | 2470 | 3606 | 3800 | 3300 |
| Total Buoyancy (kg) | 0 | 72463 | 422700 | 69745 | 63403 | 0 | 87173 |
| Max. Tension (kN) | 400 | 75 | 246 | 89 | 198 | 400 | 113 |

Dynamic Screening

The second step of the analysis consisted of selected dynamic cases for the remaining configurations. This dynamic screening may be used to differentiate between the remaining configurations. Critical dynamic cases were run on the four remaining configurations from the previous step to assess the dynamic behavior of the solutions. A screening was also performed on the cable length and on repartition of the buoyancy assemblies over the cable to optimize the four configurations with regard to each's dynamic behavior. The multiple floating wave solution was split into sub-solutions of three, four, five, and six sections (called "waves"), in the middle of which the buoyancy assemblies were applied. The results are presented in Table 3.

From this step, both U-shape buoyant and catenary buoyant solutions were rejected due to excessive maximum tension. From the different sub-solutions amongst the multiple lazy wave, the six floating lazy wave configuration performed best overall, with best or near-best results. As a result, the preferred solution at the end of this step in the screening process was the Six floating lazy wave (lowest cable loads, low cable length, medium buoyancy requirement).

TABLE 3

| Dynamic Screening | | | | | | | |
| --- | --- | --- | --- | --- | --- | --- | --- |
| Configuration | U-Shape Buoyant | Triple Floating Lazy Wave | Four Floating Lazy Wave | Five Floating Lazy Wave | Six Floating Lazy Wave | Touchdown Lazy Wave | Catenary Buoyant |
| Total Cable Length (m) | 2400 | 2590 | 2360 | 2570 | 2470 | 3606 | 3300 |
| Total Buoyancy (kg) | 72463 | 72974 | 69802 | 79320 | 69802 | 63403 | 87183 |
| Max. Tension (kN) | 806 | 177 | 228 | 200 | 164 | 242 | 950 |

Note that the multiple floating lazy wave solutions in general have 1000 m less cable than the touchdown lazy wave with only marginally higher buoyancy requirements. While the optimum number of buoyant assemblies was determined to be six, above, in embodiments, the optimum number may be greater or less than six, depending on the various technical and economic factors.

The following paragraphs include enumerated embodiments.

Embodiment 1. A cable assembly for conducting power from a first floating platform to a second floating platform while maintaining the cable assembly off a seabed and reducing tension at cable to platform connections, comprising: a cable; and a first buoyant section joined to the cable, wherein: the first buoyant section is configured to provide buoyancy such that, when the cable is connected to the first and second floating platforms, the first buoyant section is submerged below a sea surface and the cable does not contact the seabed.

Embodiment 2. The cable assembly of embodiment 1, wherein: the first floating platform includes a first floating wind turbine platform; and the cable includes an insulated conductive cable dimensioned to conduct a power production of at least the first floating wind turbine platform.

Embodiment 3. The cable assembly of embodiment 1, wherein: the first buoyant section is configured to provide buoyancy such that, when the cable is connected to the first and second floating platforms, the cable does not contact the seabed and the first buoyant section floats submerged such that the first buoyant section is convex toward the sea surface.

Embodiment 4. The cable assembly of embodiment 3, wherein: the first buoyant section includes a first plurality of buoyant modules, each module connected to the cable and the first plurality of buoyant modules distributed along a first section of the cable.

Embodiment 5. The cable assembly of embodiment 3 further comprising a second buoyant section joined to the cable with a second section of the cable between the first and second buoyant assemblies, wherein: the second buoyant section is configured to provide buoyancy such that, when the cable is connected to the first and second floating platforms, both the first buoyant section and the second buoyant section float submerged and the cable does not contact the seabed; and the second buoyant section floats submerged such that the second buoyant section is convex toward the sea surface.

Embodiment 6. The cable assembly of embodiment 5 further comprising: a first anchor connected to the cable within the second section of the cable.

Embodiment 7. The cable assembly of embodiment 5 further comprising: a terminal buoyant module connected to a first end of the cable with a third section of the cable between the terminal buoyant module and the first buoyant section, wherein: the terminal module is configured to provide buoyancy such that when the first end of the cable is not connected to the first floating platform, the terminal module floats at the surface and the first and second buoyant assemblies are submerged and the cable does not contact the seabed.

Embodiment 8 The cable assembly of embodiment 7 further comprising a second anchor connected to the cable between the second buoyant section and a second end of the cable.

Embodiment 9. A system comprising: a first floating platform; a second floating platform; and a cable assembly connectable between the first floating platform and the second floating platform, the cable assembly including: a cable; and a first buoyant section joined to the cable, wherein: the first buoyant section is configured to provide buoyancy such that, when the cable is connected to the first and second floating platforms, the first buoyant section is submerged and the cable does not contact the seabed.

Embodiment 10. The system of embodiment 9, wherein: the first floating platform includes a first floating wind turbine platform; the second floating platform includes a second floating wind turbine platform; and the cable includes an insulated conductive cable dimensioned to conduct a power production of at least the first floating wind turbine platform.

Embodiment 11. The system of embodiment 9, wherein: the first buoyant section is configured to provide buoyancy such that, when the cable is connected to the first and second floating platforms, the cable does not contact the seabed and the first buoyant section floats submerged such that the first buoyant section is convex toward a sea surface.

Embodiment 12. The system of embodiment 11, wherein: the first buoyant section includes a first plurality of buoyant modules, each module connected to the cable and the first plurality of buoyant modules distributed along a first section of the cable.

Embodiment 13. The system of embodiment 11 further comprising a second buoyant section joined to the cable with a second section of the cable between the first and second buoyant assemblies, wherein: the second buoyant section is configured to provide buoyancy such that, when the cable is connected to the first and second floating platforms, both the first buoyant section and the second buoyant section float submerged and the cable does not contact the seabed; and the second buoyant section floats submerged such that the second buoyant section is convex toward the sea surface.

Embodiment 14. The system of embodiment 13 further comprising: a first anchor connected to the cable within the second section of the cable.

Embodiment 15. The system of embodiment 14 further comprising: a terminal buoyant module connected to a first end of the cable with a third section of the cable between the terminal buoyant module and the first buoyant section, wherein: the terminal module is configured to provide buoyancy such that when the first end of the cable is not connected to the first floating platform, the terminal module floats at the surface and the first and second buoyant assemblies are submerged and the cable does not contact the seabed.

Embodiment 16. The system of embodiment 15 further comprising a second anchor connected to the cable between the second buoyant section and a second end of the cable.

Embodiment 17. A method for providing an electrical connection between a first floating platform and a second floating platform, the method comprising: providing a cable assembly connectable between the first floating platform and the second floating platform, the cable assembly including: a cable; and a first buoyant section joined to the cable, wherein: the first buoyant section is configured to provide buoyancy such that, when the cable is connected to the first and second floating platforms, the first buoyant section is submerged and the cable does not contact the seabed; and connecting the cable assembly to electrical connections of the first floating platform and the second floating platform.

Embodiment 18. The method of embodiment 17, wherein: the first buoyant section is configured to provide buoyancy such that, when the cable is connected to the first and second floating platforms, the cable does not contact the seabed and the first buoyant section floats submerged such that the first buoyant section is convex toward a sea surface.

Embodiment 19. The method of embodiment 18, wherein: the first buoyant section includes a first plurality of buoyant modules, each module connected to the cable and the first plurality of buoyant modules distributed along a first section of the cable.

Embodiment 20. The method of embodiment 18 further comprising: providing a second buoyant section joined to the cable with a second section of the cable between the first and second buoyant assemblies, wherein: the second buoyant section is configured to provide buoyancy such that, when the cable is connected to the first and second floating platforms, both the first buoyant section and the second buoyant section are submerged and the cable does not contact the seabed; and the second buoyant section floats submerged such that the second buoyant section is convex toward the sea surface.

Embodiment 22. The method of embodiment 21 further comprising: providing a first anchor connected to the cable within the second section of the cable; providing a first terminal buoyant module connected to a first end of the cable with a third section of the cable between the terminal buoyant module and the first buoyant section, wherein: the first terminal module is configured to provide buoyancy such that when the first end of the cable is not connected to the first floating platform, the first terminal module floats at the surface and the first and second buoyant assemblies are submerged and the cable does not contact the seabed; and disconnecting the first end of the cable from the first floating platform allowing the first terminal module to float at the surface.

Embodiment 23. The method of embodiment 22 further comprising: providing a second anchor connected to the cable between the second buoyant section and a second end of the cable; providing a second terminal buoyant module connected to the second end of the cable with a fifth section of the cable between the second terminal buoyant module and the second buoyant section, wherein: the second terminal module is configured to provide buoyancy such that when the second end of the cable is not connected to the second floating platform, the second terminal module floats at the surface and the first and second buoyant assemblies are submerged and the cable does not contact the seabed; and disconnecting the second end of the cable from the second floating platform allowing the second terminal module to float at the surface.

The previous description is provided to enable any person skilled in the art to practice the various aspects described herein. In the embodiments, the separation of various system components in the embodiments described above should not be understood as requiring such separation in all embodiments. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference.

We claim:

1. A cable assembly, comprising:
a cable having a plurality of cable sections, a first cable end, and a second cable end;
a first buoyant section joined to the cable at a first cable section;
a second buoyant section joined to the cable at a second cable section, and a third cable section extending between the first buoyant section and the second buoyant section; and
a terminal buoyant module connected to the first cable end, and a fourth cable section extending between the terminal buoyant module and the first buoyant section, wherein:
the first buoyant section and the second buoyant section are configured to provide buoyancy to the cable such that, when the cable is connected to a first floating platform and a second floating platform, the first buoyant section and the second buoyant section float submerged below a sea surface such that the first cable section and the second cable section are convex toward the sea surface and the cable does not contact the seabed; and
the terminal module is configured to provide buoyancy such that, when the first end of the cable is not connected to the first floating platform, the terminal module floats at the surface and the first and second buoyant sections are submerged and the cable does not contact the seabed.

2. The cable assembly of claim 1, wherein:
the first floating platform includes a first floating wind turbine platform; and
the cable includes an insulated conductive cable dimensioned to conduct a power production of at least the first floating wind turbine platform.

3. The cable assembly of claim 1, wherein:
the first buoyant section includes a first plurality of buoyant modules, each buoyant module connected to the cable and the first plurality of buoyant modules distributed along the first cable section.

4. The cable assembly of claim 1 further comprising: a first anchor connected to the cable within the third cable section.

5. The cable assembly of claim 1, further comprising a second anchor connected to the cable at the second cable end or between the second buoyant section and the second cable end.

6. A cable assembly, comprising:
a cable having a plurality of cable sections, a first cable end and a second cable end;
a first buoyant section joined to the cable at a first cable section;
a second buoyant section joined to the cable at a second cable section, and a third cable section extending between the first buoyant section and the second buoyant section, wherein:
the first buoyant section and the second buoyant section are configured to provide buoyancy to the cable such that, when the cable is connected between a first floating platform and a second floating platform, the first buoyant section and the second buoyant section float submerged below a sea surface such that the first cable section and the second cable section are convex toward the sea surface and the cable does not contact the seabed; and
when the first cable end is not connected to the first floating platform, the first cable end hangs in the water column.

7. A system comprising:
a first floating platform;
a second floating platform; and
a cable assembly connectable between the first floating platform and the second floating platform, the cable assembly including:
a cable having a plurality of cable sections, a first cable end, and a second cable end;
a first buoyant section joined to the cable at a first cable section;
a second buoyant section joined to the cable at a second cable section, and a third cable section extending between the first buoyant section and the second buoyant section; and a terminal buoyant module connected to the first cable end, and a fourth cable section extending between the terminal buoyant module and the first buoyant section, wherein:

the first buoyant section and the second buoyant section are configured to provide buoyancy to the cable such that, when the cable is connected between the first and second floating platforms, the first buoyant section and the second buoyant section float submerged below a sea surface such that the first cable section and the second cable section are convex toward the sea surface and the cable does not contact the seabed; and the terminal module is configured to provide buoyancy such that, when the first cable end is not connected to the first floating platform, the terminal module floats at the surface and the first and second buoyant sections float submerged and the cable does not contact the seabed.

8. The system of claim 7, wherein:

the first floating platform includes a first floating wind turbine platform;

the second floating platform includes a second floating wind turbine platform; and the cable includes an insulated conductive cable dimensioned to conduct a power production of at least the first floating wind turbine platform.

9. The system of claim 7, wherein:

the first buoyant section includes a first plurality of buoyant modules, each buoyant module connected to the cable and the first plurality of buoyant modules distributed along the first cable section.

10. The system of claim 7 further comprising: a first anchor connected to the cable within the third cable section.

11. The system of claim 10, further comprising a second anchor connected to the cable at the second cable end or between the second buoyant section and the second cable end.

12. A method for providing an electrical connection between a first floating platform and a second floating platform, the method comprising:

providing a cable assembly connectable between the first floating platform and the second floating platform, the cable assembly including:
  a cable having a plurality of cable sections, a first cable end, and a second cable end;
  a first buoyant section joined to the cable at a first cable section;
  a second buoyant section joined to the cable at a second cable section, and a third cable section extending between the first buoyant section and the second buoyant section; and
  a terminal buoyant module connected to the first cable end, and a fourth cable section extending between the terminal buoyant module and the first buoyant section, wherein:

the first buoyant section and the second buoyant section are configured to provide buoyancy to the cable such that, when the cable is connected between the first and second floating platforms, the first buoyant section and the second buoyant section float submerged below a sea surface such that the first cable section and the second cable section are convex toward the sea surface and the cable does not contact the seabed; and connecting the cable assembly to electrical connections of the first floating platform and the second floating platform.

13. The method of claim 12, wherein:

the first buoyant section includes a first plurality of buoyant modules, each buoyant module connected to the cable and the first plurality of buoyant modules distributed along first cable section.

14. The method of claim 12 further comprising:

providing a first anchor connected to the cable within the third cable section;

and disconnecting the first end of the cable from the first floating platform allowing the first terminal module to float at the surface.

15. The method of claim 14 further comprising:

providing a second anchor connected to the cable at the second cable end or between the second buoyant section and the second cable end;

providing a second terminal buoyant module connected to the second cable end, wherein:
  the second terminal module is configured to provide buoyancy to the cable such that when the second cable end is not connected to the second floating platform, the second terminal module floats at the surface and the first and second buoyant sections float submerged and the cable does not contact the seabed; and disconnecting the second cable end from the second floating platform allowing the second terminal module to float at the surface.

* * * * *